W. C. BLASKA.
LIGHTER.
APPLICATION FILED JAN. 28, 1911.

993,950.

Patented May 30, 1911.

Witnesses
Edwin F. McKee

Inventor
William C. Blaska
By Victor J. Evans
Attorney

UNITED STATES PATENT OFFICE.

WILLIAM C. BLASKA, OF BARABOO, WISCONSIN.

LIGHTER.

993,950.

Specification of Letters Patent.    Patented May 30, 1911.

Application filed January 28, 1911. Serial No. 605,248.

*To all whom it may concern:*

Be it known that I, WILLIAM C. BLASKA, a citizen of the United States of America, residing at Baraboo, in the county of Sauk and State of Wisconsin, have invented new and useful Improvements in Lighters, of which the following is a specification.

This invention relates to lighters and particularly to one designed for the lighting of gas lamps, burners or the like where natural or artificial gaseous fluid may be discharged, the object of the invention being to provide a novel form of handle member for supporting a friction surface and a friction element of spark-producing quality to be moved across the friction surface to form a spark to ignite the gas.

Figure 1:
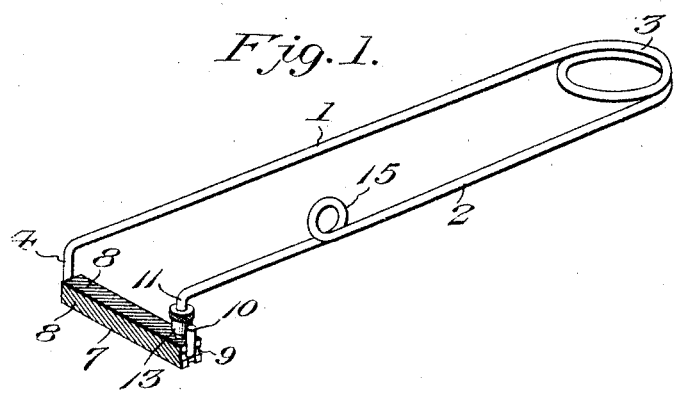
Figure 2:
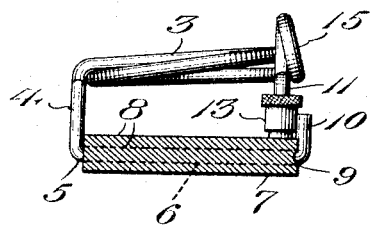
Figure 3:
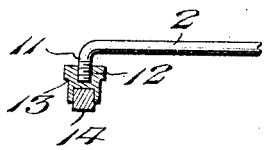

In the drawing, forming a portion of this specification and in which like numerals of reference indicate similar parts in the several views:—Figure 1 is a detail perspective view of my improved lighter. Fig. 2 is a front view thereof. Fig. 3 is a detail section through a portion of the handle showing the friction element thereon.

My improved lighter consists preferably of a handle member which is formed from a single length of wire or other suitable well known springy material. The member is constructed to provide a support 1 and a movable actuating member 2, the said members 1 and 2 being connected with each other by an intermediate coiled portion 3 which presents to the handle member such springiness as will permit the support 1 and the member 2 to move relatively. The support 1 is provided at its forward end with a downwardly extending portion 4 which is offset, as shown at 5, to extend through the longitudinal passage 6 in the friction element 7. The friction element is preferably of rectangular form in cross section so as to present a plurality of working surfaces 8, each surface being serrated or roughened in any well known suitable manner for a purpose to be hereinafter described.

The friction element 7 is formed at its ends to provide recesses 9 in which the depending portion 4 and the upstanding portion 10 of the support 1 are interchangeably engaged so that when one of the surfaces of the friction element has been used to an extent that the ignition qualities of the device are decreased a new surface may be produced. The actuating member 2 is formed at its extremity to provide a depending threaded shank 11 which fits the correspondingly formed passage 12 in the spark-producing element 13. The spark-producing element 13 is composed of a composition of iron, brass and sulfur, or flint or such elements may be constructed of other metal of any well known character which may be found most suitable for the purpose intended. The element 13 has its lower surface 14 contacting with the exposed friction surface of the element 7 and its movement in one direction across the surface is limited by the stop-forming portion 10 of the support 1. The actuating element 2 is provided with an upstanding coiled portion 15 intermediate of its length which may be grasped by the hand or pressed by the thumb when it is desired to move the element 13 across the friction surface of the element 7.

The device described and shown herein will be found most efficient for the purpose intended and it may be manufactured at a relatively low cost, obviating the use of matches or the like for the ignition of gaseous bodies or fluids. In lighting, the device is placed so that the elements 7 and 13 are arranged in close proximity to the lamp and on moving the support 1 and the actuating member 2 relatively a spark or sparks will be produced between the surfaces of the spark-producing elements. By constructing the actuating member 2 to provide the depending threaded shank 11 it will be seen that means are employed for the detachable engagement therewith of the friction element 13 so that on wear of such friction element it may be removed and a new one replaced at a minimum cost.

I claim:—

A lighter comprising a support, an element rotatably mounted on the support and provided with a plurality of friction surfaces, the said element having recesses therein, means on the support for interchangeable engagement in the recesses to hold the element against movement, a movable actuating member, and a friction element carried by the actuating member and movable across one of the friction surfaces of the rotatable element.

In testimony whereof I affix my signature in presence of two witnesses.

WILLIAM C. BLASKA.

Witnesses:
 WILLIAM E. MILLARD,
 CARL M. DU BOIS.